United States Patent [19]

Pugin et al.

[11] 4,083,687

[45] Apr. 11, 1978

[54] PROCESS FOR THE DYEING OF THERMOPLASTICS

[75] Inventors: André Pugin, Riehen; Volkhard Wiese, Pratteln, both of Switzerland

[73] Assignee: Ciba-Geigy Corporation, Ardsley, N.Y.

[21] Appl. No.: 697,604

[22] Filed: Jun. 18, 1976

[30] Foreign Application Priority Data

Jul. 4, 1975 Switzerland ............... 8743/75

[51] Int. Cl.$^2$ ............... C09B 45/00; D06P 3/00
[52] U.S. Cl. ............... 8/42 D; 8/4; 8/89 R; 8/92; 8/168 D; 8/169; 8/179; 8/180
[58] Field of Search ............... 8/42 D, 180, 89 R, 92, 8/169, 4

[56] References Cited

U.S. PATENT DOCUMENTS 2,694,055  11/1954  Ludwig et al. ............... 260/151

FOREIGN PATENT DOCUMENTS 1,312,198  4/1973  United Kingdom.
1,001,494  8/1965  United Kingdom.
691,482  5/1953  United Kingdom.

Primary Examiner—A. Lionel Clingman
Attorney, Agent, or Firm—Vincent J. Cavalieri

[57] ABSTRACT

Process for dyeing thermoplastics having no reducing action, in which process there are used Mg, Zn, Cd and Ni salts of azo dye sulphonic acids of the formula

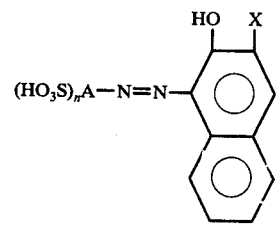

wherein A represents a phenyl or naphthyl group optionally substituted by halogen atoms, by alkyl or alkoxy groups containing 1 - 4 C atoms, or by trifluoromethyl groups, X represents a hydrogen atom or a carboxy group, and $n$ represents the number 1 or 2.

The resulting dyeings are characterized by excellent fastness properties, especially fastness to light and to migration.

7 Claims, No Drawings

PROCESS FOR THE DYEING OF THERMOPLASTICS

It is known that Ca, Sr and Ba salts of azo dye sulphonic acids of the formula

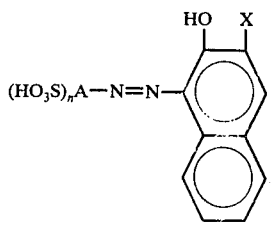

wherein A represents a phenyl or naphthyl group optionally substituted by halogen atoms, by alkyl or alkoxy groups containing 1 –4 C atoms or by trifluoromethyl groups, X represents a hydrogen atom or a carboxy group and $n$ represents the number 1 or 2 are suitable only to a very limited extent for dyeing in the melt on account of inadequate heat stability. Distinct variations of shade in polyolefins are discernible even at 200°–220° C.

It is also known that manganese salts, although having good heat stability and fastness to light, unfavourably influence the stability of the polymers.

It has now been found that the Mg, Zn, Cd, and Ni salts of the dye sulphonic acids of formula (I) are excellently suitable, by virtue of their good heat stability, for dyeing thermoplastics having no reducing action, particularly for dyeing polyolefins.

The sulphonic acids on which the salts are based are obtained by coupling a diazotised aminobenzenesulphonic acid, for example 1-aminobenzene-2-, -3- or -4-sulphonic acid,
1-aminobenzene-2,5-disulphonic acid,
1-amino-4- or -5-methylbenzene-2-sulphonic acid,
1-amino-4-chlorobenzene-2-sulphonic acid,
1-amino-4-methyl-5-chlorobenzene-2-sulphonic acid,
1-amino-5-trifluoromethylbenzene-2-sulphonic acid,
1-amino-4-chlorobenzene-2,5-disulphonic acid,
2-aminonaphthalene-1-sulphonic acid,
1-amino-4-methoxybenzene-2-sulphonic acid,
1-amino-3-methyl-4-methoxybenzene-2-sulphonic acid, with 2 hydroxynaphthalene or with 2,3-hydroxynaphthoic acid.

Salts of azo dye sulphonic acids preferably used are those of the formaula

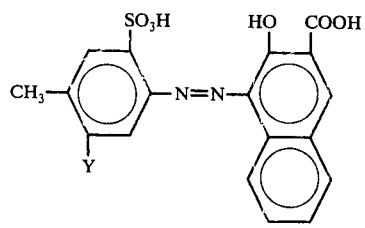

wherein Y represents a hydrogen or chlorine atom.

The salts to be used according to the invention are obtained, for example, by reaction of the Na salts of the azo dye sulphonic acids with soluble salts of the corresponding metals.

There are preferably used on account of their heat stability and physiological harmlessness the Mg salts, and on account of their heat stability and fastness to light the Cd salts.

As thermoplastics having no reducing action, there may be mentioned in particular polyolefins such as polyethylene, polypropylene or polyisobutylene. Also mentioned are: polyvinyl chloride, polystyrene, copolymers of styrene, such as ABS, as well as linear polyesters.

Dyeing is performed by the usual processes, for example by mixing of the dye salts with the plastics granulate or plastics powder, and extrusion of the mixture into the form of fibres, sheets or granulates. The last-mentioned can subsequently be moulded in the injection moulding process to obtain shaped articles.

The dye salts can also be firstly processed into the form of concentrates or preparations, and can then be used in this form for dyeing.

Of special interest on account of the ease with which they can be incorporated into the thermoplastics are the mixtures of Zn, Cd, Ca, Ni and, particularly advantageously, Mg salts of higher molecular carboxylic acids or sulphonic acids, such as of anion-active surfactants, of acid resins and of polymers with the corresponding salts of azo dye sulphonic acid.

Suitable surfactants (tensides) are, for example, dodecylbenzenesulphonic acid, dodecylbenzoic acid, stearic acid, behenic acid, abietic acid, dehydroabietic acid, oleic acid, dialkylsulphosuccinic acid, partial esters of polyvalent organic and inorganic acids, such as laurylsulphuric acid or mono- and dilaurylphosphoric acid.

The salts mentioned have a good dispersing property and are physiologically harmless Suitable resins are, for example, polyacrylic acids and mixed polymers from acrylic acid and other monomers, mixed polymers of crotonic acid, of maleic acid, e.g. with styrene or other polymerisable monomers, inter alia with vinyl, acryl or allyl radicals.

It is advantageous to use mixtures with 5–80 per cent by weight, preferably 10–50 per cent by weight, of the surfactant salts relative to the dye salts.

Such mixtures are advantageously produced by precipitation of a mixture of the corresponding alkali salts by means of water-soluble metal salts, preferably with water-soluble Mg salts.

The resulting dyeings are characterised by excellent fastness properties, especially fastness to light and to migration.

Except where otherwise stated in the following Examples, the term 'parts' denotes parts by weight, percentages are given as per cent by weight, and temperature values are in degrees Centigrade.

EXAMPLE 1

100 g of a polyethylene of high density (Vestolen A 6016, Chem. Werke Huls) is mixed dry with 1 g of titanium dioxide (Kronos Cl 220) and with 0.1 g of the Mg salt of the dye obtained by the coupling of 1-amino-4-methylbenzene-2-sulphonic acid with 2-hydroxynaphthalene-3-carboxylic acid; the mixture is pre-extruded at 220° C and then processed by injection moulding at 270° into the form of platelets. There are obtained in this manner red injection-moulded platelets fast to light, which, compared with samples processed at 220° C, display practically no differences of shade.

The Mg salt used in this test is produced by treatment of the corresponding Na salt with magnesium sulphate at pH 7.0

A similarly good stability to heat, but a poorer fastness to light, is obtained with the corresponding Zn salts.

It is also possible to use, instead of the Mg and Zn salts employed above, the Mg, Zn and Cd salts of the dyes produced by the coupling of 1-amino-4-methyl-5-chlorobenzene-2-sulphonic acid with 2-hydroxynaphthalene-3-carboxylic acid, or the coupling of 2-aminonaphthalene-1-sulphonic acid with 2-hydroxynaphthalene or 2-hydroxynaphthalene-3-carboxylic acid. There are obtained red to maroon-coloured, thermostable polyethylene injection-moulded platelets.

EXAMPLE 2

900 g of a polyethylene of high density (Vestolen A6016, Chem. Werke Hüls) and 100 g of the Mg salt used in Example 1 are processed by means of a 'Lödige' mixer and Ko-kneader into the form of a 10% dye concentrate. 3 g of this granulate-like concentrate is mixed with 97 g of polyethylene of high density, and the mixture is injection moulded at 280°. There are obtained in this manner red injection-moulded platelets having a shade identical to that which the material has when extruded at 220°. The fastness to light is very good.

More-yellowish plateles exhibiting excellent heat stability are obtained also if the pigment used is the Mg salt of the dye obtained by coupling 1-amino-4-methyl-5-chlorobenzene-2-sulphonic acid with 2-hydroxynaphthalene-3-carboxylic acid.

Polyethylene can be well dyed also by using the Zn, Cd or Ni salts of the two above-mentioned dyes. The variations of shade associated with the temperature of extrusion are much smaller than in the case of the corresponding Ca and Sr salts.

EXAMPLE 3

1 g of a pigment preparation, produced according to CH-PS 495.412, consisting of 40 parts of the pigment described in Example 1 of this application and 60 parts of Mg behenate is mixed with 99 parts of polypropylene (Daplen DM 55, 'Oesterreichische Stickstoffwerke' [Austrian Nitrogen Works]). The mixture is then spun at 285° C with a retention time in the spinning apparatus of about 10 minutes. There are obtained red polypropylene fibres which are fast to light and which have good general textile properties. The same dyed mixture can also be used to produce dyed sheets.

EXAMPLE 4

0.2 g of the Mg salt of a dye obtained by coupling 1-amino-4-methylbenzene-2-sulphonic acid with 2-hydroxynaphthalene-3-carboxylic acid is pre-mixed dry with 100 g of polystyrene (Lustrex HF 77, Monsanto), and the mixture is pre-extruded in a single screw extruder at 200° C. The granulate thus obtained is converted in the injection moulding process at 240° into the form of sample platelets. There are obtained in this manner brilliant red platelets having good fastness to light.

EXAMPLE 5

100 g of the Mg salt of the dye obtained by coupling 1-amino-4-methyl-5-chlorobenzene-2-sulphonic acid with 2-hydroxynaphthalene-3-carboxylic acid is processed with 900 g of copolymer acryl-butadiene-styrene (Terluran 877 T, BASF) in an internal kneader to give a master batch. 40 g of this master batch is converted with 360 g of Terluran 877 T in the injection moulding process at 250° C into the form of sample platelets. There are thus obtained brilliant red platelets having good fastness to light.

EXAMPLE 6

100 g of a pulverulent soft PVC, consisting of 65 parts of a suspension PVC and 35 parts of dioctylphthalate, is processed with 1 g of Mg salt produced in Example 1 (1st paragraph) and 1 g of $TiO_2$ on a roll mill at 165° C to form a sheet. In order to obtain the best possible dispersion, the sheet is subsequently rolled again, firstly at 40° and then at 165° C.

The heat test (10 minutes at 200°) shows a stability of shade better than that shown by the heat test with the corresponding Ca or Sr salt.

EXAMPLE 7

38.6 g of the dye obtainable by coupling 1-amino-4-methylbenzene-2-sulphonic acid with 2-hydroxynaphthalene-3-carboxylic acid and 34 g of behenic acid are reacted in 2 liters of water with 300 ml of a 1N potassium hydroxide solution at 60°. To the red suspension there is added a solution of 37 g of magnesium sulphate heptahydrate in 200 ml of KOH, and the whole is rapidly stirred for 1 hour at 80°.

The red precipitate is filtered off and washed free from salt with water; the residue is dried in vacuo at 60°.

0.5 g of this mixture is mixed dry with 99.5 g of a polyethylene of high density (Vestolen A 6016, Chem. Werke Hüls); the mixture is pre-extruded at 220° and then processed by injection moulding at 260° into the form of platelets. The red platelets are very deeply coloured and are homogeneously dyed.

EXAMPLE 8

0.05 mole of a solution of the potassium salt of stearic acid is added at 60° to 0.1 mole of a non-isolated suspension, in 1.5 liters of water, of the Na salt of the dye obtainable by coupling 1-amino-4-methyl-5-chlorobenzene-2-sulphonic acid with 2-hydroxynaphthalene-3-carobxylic acid. There is then added, with thorough stirring, 0.125 mole of magnesium sulphate heptahydrate dissolve in 100 ml of water; the red suspension is further stirred for 1 hour at 70-80°, whereby the pH value attains 6.3. The pigment is filtered off, washed free from salt with water and dried at 60-70° in vacuo to obtain 59 g of a red powder. 0.5 g of this powder is processed with 100 g of a pulverulent soft PVC, composed of 65 parts of a suspension PVC and 35 parts of dioctylphthalate, on a roll work at 165° to form a sheet. A perfect dispersion of the pigment is obtained without any particular intensified dispersion measures.

The pigment can be very well incorporated according to Example 7 also into polyethylene of high density, and the product obtained displays good heat stability and fastness to light Equally good results are obtained if in this Example the stearic acid is replaced by 0.5 mole of behenic acid or dehydroabietic acid.

Deeply coloured bluer dyeings having good heat stability and good fastness to light are obtained by adding, instead of magnesium sulphate, 0.125 mole of nickel acetate-tetrahydrate.

EXAMPLE 9

A non-delustered polyethylene terephthalate granulate suitable for producing fibres is shaken, for 15 minutes in a shaking machine, in a closable vessel together with 1% of the magnesium salt of the dye obtained by coupling 1-amino-4-methyl-5-chlorobenzene-2-sulphonic acid with 2-hydroxynaphthalene-3-carboxylic acid. The evenly dyed granules are spun on a melt spinning machine (285° ± 3°, retention time in the spinning machine about 5 minutes) to form filaments, which are stretched on a draw twister and spooled. In consequence of the solubility of the dye in polyethylene terephthalate, there is obtained a brilliant red dyeing which is characterised by outstanding fastness to light, and excellent fastness to washing, dry-cleaning, cross-dyeing and sublimation, as wel as by a high stability to chlorite bleaching.

We claim:

1. A process for dyeing polyolefins in which process there are used Mg or Cd salts of an azo dye sulphonic acid of the formula

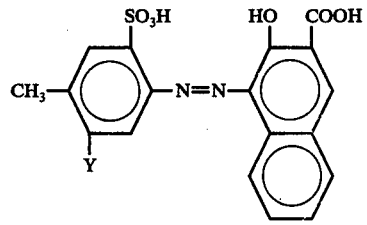

wherein Y represents hydrogen or a chlorine atom.

2. Process according to claim 1, wherein there are used mixtures which are obtained by the admixture of the Mg, and Cd salts of azo dye sulphonic acids of the given formula with the Mg, Zn, Cd, Ca and Ni salts of higher molecular carboxylic acids or sulphonic aids.

3. Process according to claim 1, wherein there are used mixtures which are obtained by the admixture of Mg salts and Ca salts of dehydroabietic acids, behenic acid or stearic acid with the Mg and CD salts of azo dye sulphonic acids according to claim 1.

4. Process according to claim 3, wherein there are used mixtures which are obtained by the admixture of Mg salts of dehydroabietic acid, behenic acid or stearic acid with the Mg salts of azo dye sulphonic acids.

5. Process according to claim 2, wherein there is used 5–80% by weight of the salts of higher sulphonic acids or carboxylic acids, relative to the dye sulphonic acids.

6. Process according to claims 2, wherein there is used 10–50% by weight of the salts of higher sulphonic acids or carboxylic acids, relative to the dye sulphonic acids.

7. The dyed polyolefin obtained according to claim 1.

* * * * *